United States Patent [19]

Jung et al.

[11] Patent Number: 5,559,216
[45] Date of Patent: Sep. 24, 1996

[54] SINGLE-STEP PROCESS FOR THE PREPARATION OF BIS-(ACETOACETYLAMINO) BENZENE DISAZO PIGMENTS

[75] Inventors: Ruediger Jung; Joachim Weide, both of Kelkheim; Hans J. Metz, Darmstadt, all of Germany

[73] Assignee: Hoechst AG, Germany

[21] Appl. No.: 115,894

[22] Filed: Sep. 1, 1993

[30] Foreign Application Priority Data

Sep. 2, 1992 [DE]  Germany ................. 42 29 207.7

[51] Int. Cl.$^6$ ............ C09B 41/00; C09B 33/153; C09B 56/12; C09D 11/02; B41M 1/00
[52] U.S. Cl. ............ 534/579; 534/887; 534/656; 534/740; 534/748; 106/22 K
[58] Field of Search ................ 534/579, 887, 534/740, 748, 656; 106/22 K

[56] References Cited

U.S. PATENT DOCUMENTS

| | | | |
|---|---|---|---|
| 2,478,767 | 8/1949 | Locke | 534/579 |
| 3,413,279 | 11/1968 | Mueller | 534/579 |
| 3,441,555 | 4/1969 | Towle, II et al. | 534/740 |
| 3,513,154 | 5/1970 | Towle, III et al. | 534/740 |
| 3,759,733 | 9/1973 | Bradley et al. | 534/740 |
| 3,793,305 | 2/1974 | Balon | 534/579 |
| 3,872,078 | 3/1975 | Cseh, I et al. | 534/740 |
| 3,978,038 | 8/1976 | Cseh, II et al. | 534/740 |
| 4,055,559 | 10/1977 | Cseh, III et al. | 534/740 |
| 4,220,586 | 9/1980 | Cseh, IV et al. | 534/579 |
| 4,785,082 | 11/1988 | Weide et al. | 534/887 |
| 4,980,459 | 12/1990 | Rabassa et al. | 534/579 |
| 5,030,247 | 7/1991 | Goldmann | 534/573 X |

FOREIGN PATENT DOCUMENTS

| | | | |
|---|---|---|---|
| 71369/74 | 7/1974 | Australia | 534/527 |
| 1135688 | 11/1982 | Canada | 534/579 |
| 0025164 | 3/1981 | European Pat. Off. | 534/579 |
| 1085278 | 7/1960 | Germany | 534/579 |
| 1544453 | 4/1970 | Germany | 534/579 |
| 2643214 | 4/1978 | Germany | 534/579 |
| 1066769 | 4/1967 | United Kingdom | 534/579 |
| 1552080 | 9/1979 | United Kingdom | 534/887 |
| 2239254 | 7/1992 | United Kingdom | 534/579 |

Primary Examiner—Floyd D. Higel
Attorney, Agent, or Firm—Connolly & Hutz

[57] ABSTRACT

An ecologically and economically advantageous process for preparing a disazo pigment of the formula (I) or a mixture of said disazo pigments

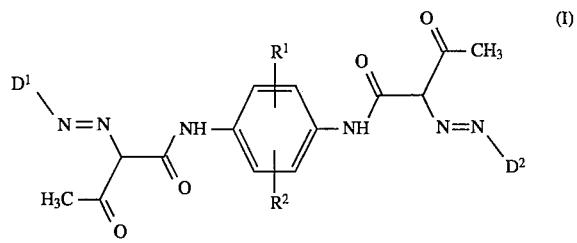

where $D^1$ and $D^2$ are identical or different and each is unsubstituted phenyl, phenyl with from 1 to 5 substituents, unsubstituted naphthyl, naphthyl with from 1 to 3 substituents, unsubstituted anthraquinonyl, anthraquinonyl with from 1 to 3 substituents, or a radical of a fused aromatic heterocycle which contains from 1 to 3 identical or different heteroatoms from nitrogen or oxygen and sulfur and is unsubstituted or has from 1 to 3 substituents, $R^1$ and $R^2$ are identical or different and each is hydrogen, halogen, $C_1$–$C_4$-alkyl, $C_1$–$C_4$-alkoxy, $C_1$–$C_5$-alkoxycarbonyl, nitro, cyano, phenoxy or trifluoromethyl, by azo coupling, comprises a) azo coupling in an aqueous medium and in the absence of an organic solvent in a single step and b) adding at the latest immediately prior to the isolation of the disazo pigment at least one nonionic surfactant which has a cloud point in aqueous solution.

18 Claims, No Drawings

SINGLE-STEP PROCESS FOR THE PREPARATION OF BIS-(ACETOACETYLAMINO) BENZENE DISAZO PIGMENTS

The present invention relates to the field of disazo pigments.

Disazopigments of the formula (I)

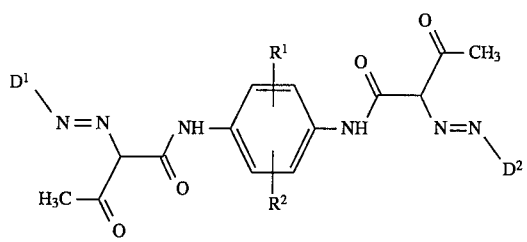

and processes for preparing them are described inter alia in the following patents and patent applications:

GB-A-10 66 769, U.S. Pat. No. 3,872,078, GB-A-22 39 254, CA-A-11 35 688, U.S. Pat. No. 3,413,279 and U.S. Pat. No. 3,513,154.

However, almost all the processes described involve an operation in the presence of an organic solvent in order that the pigments may be obtained in useful form. In many cases there is a need for an additional operation, for example aftertreating the crude pigments in an organic solvent.

U.S. Pat. No. 3,759,733 describes the preparation of a pigment of the formula (I) without the use of a solvent. However, the pigment obtained does not meet the present-day printing ink pigment requirements.

CA-A-11 35 688 and U.S. Pat. No. 3,978,038 describe processes wherein the pigments of the formula (I), prepared in an aqueous medium, are aftertreated in solvents, for example dimethylformamide, N-methyl-2-pyrrolidone, nitrobenzene or o-dichlorobenzene, as an additional operation.

U.S. Pat. No. 3,951,943 describes a process for preparing said pigments in an aqueous medium, but said aqueous medium contains large proportions of cyclic ether, for example tetrahydrofuran or 1,4-dioxane.

Processes whereby disazo pigments of that type are preparable by reacting triazines with 1,4-bis(acetoacetylamino)benzenes in organic solvents are known inter alia from CA-PS 994 762, U.S. Pat. No. 3,978,038 and U.S. Pat. No. 4,055,559.

It is an object of the present invention to develop a process whereby pigments of the formula (I) are obtained in an ecologically and economically advantageous manner, in particular without organic solvents.

It has been found that pigments of the formula (I) are surprisingly preparable in an aqueous medium without a solvent and without a separate aftertreatment if one or more nonionic surfactants which have a cloud point in aqueous solution are added in the course of the preparation of the respective pigment, at the latest prior to the isolation thereof.

The present invention accordingly provides a process for preparing disazo pigments of the formula (I) or a mixture of said disazo pigments where $D^1$ and $D^2$ are identical or different and each is unsubstituted phenyl, phenyl with from 1 to 5, preferably 1 to 3, substituents, unsubstituted naphthyl, naphthyl with from 1 to 5, preferably from 1 to 3, substituents, unsubstituted anthraquinonyl, anthraquinonyl with from 1 to 5, preferably from 1 to 3, substituents, or a radical of a fused aromatic heterocycle which contains from 1 to 3 identical or different heteroatoms from nitrogen, oxygen or sulfur and is unsubstituted or has from 1 to 3 substituents, preferably a radical of a benzofused heterocyclic five- or six-membered ring, $R^1$ and $R^2$ are identical or different and each is hydrogen, halogen, $C_1$–$C_4$-alkyl, $C_1$–$C_4$-alkoxy, $C_1$–$C_5$-alkoxycarbonyl, nitro, cyano, phenoxy or trifluoromethyl, by azo coupling, which comprises a) azo coupling in an aqueous medium and in the absence of an organic solvent in a single step and b) adding at the latest immediately prior to the isolation of the disazo pigment at least one nonionic surfactant which has a cloud point in aqueous solution.

The nonionic surfactant used according to the invention can be added to various stages of the process of preparation. For example, the addition can be to the diazonium salt solution or to the solution or suspension of the coupling component prior to azo coupling. The addition can also take place at various times. Preference is given to adding prior to a heating-up of the pigment suspension. However, the nonionic surfactant must not be added later than prior to the isolation of the disazo pigment.

The pigment is isolated from the reaction mixture by filtration, pressing or similar customary measures. Washing with water is carried out at a temperature above the cloud point of the nonionic surfactant used. This makes it possible to remove soluble by-products, for example salts, without any significant effect on the surfactant content of the product.

The choice of nonionic surfactant used according to the invention and the amount of surfactant required depend on the chemical constitution, the specific surface area of the particular pigment of the formula (I), the specific process conditions and the application requirements of the pigment.

A nonionic surfactant suitable for the purposes of the present invention has to have a cloud point in aqueous solution. The cloud point of the surfactant in water is preferably between 5° and 90° C., in particular between 20° and 70° C. The cloud points are determined in accordance with DIN 53917. The amount of nonionic surfactant or surfactant mixture is between 3 and 25, preferably between 7 and 17, parts by weight, based on 100 parts by weight of pigment or pigment mixture of the formula (I).

There are potentially a large number of nonionic surfactants of differing chemical structures that are of interest for use in the process of the invention, provided they meet the condition of having a cloud point in water. Of interest in this context are alkoxylates of aromatic, cycloaliphatic or heterocyclic hydroxy or amino compounds or mixtures of at least two of said alkoxylates. Of particular suitability are nonionic alkoxylates of alcohols, fatty alcohols, phenols, alkylphenols, naphthols, alkylnapthols and fatty a mines with ethylene oxide and/or propylene oxide and block polymers of ethylene oxide and propylene oxide. The level of the cloud point of such compounds depends on the length of the polyalkylenoxy chain and can be varied in the course of the synthesis of the surfactants by the choice of the amount of ethylene oxide and/or propylene oxide used. Of particular interest are compounds having a poly(ethylenoxy) chain or a poly(ethylenoxy)poly(methylethylenoxy) chain which are bonded via an oxygen or nitrogen atom to radicals of the following kind: aliphatic or cycloaliphatic, primary or secondary, saturated or unsaturated alkyl radicals of from 6 to 26 carbon atoms, particularly preferably alkyl radicals having a chain length of from 10 to 18 carbon atoms, for example nonyl, decyl, undecyl, dodecyl, tridecyl, tetradecyl, pentadecyl, hexadecyl, heptadecyl, octadecyl, 2-butyloctyl, 2-phenyloctyl, 2-hexyldecyl, 2-heptyl-undecyl, 2-octyldodecyl, 2-nonyltridecyl, 2-decyltetradecyl, 10-undecenyl, oleyl, 9-octadecenyl, linoleyl or linolenyl, aromatic radicals such as substituted or unsubstituted phenyl or alkylphenyl having up to three primary or secondary $C_4$–$C_{12}$-alkyl radicals, preferably hexylphenyl, heptylphenyl, octylphenyl, nonylphenyl, undecylphenyl, dodecylphenyl, isononylphenyl, tributylphenyl or dinonylphenyl and phenyl substituted by further aromatic radicals, such as benzyl-p-phenyl, naphthyl or $C_1$–$C_4$-alkylnapthyl, preferably α-naphthyl or β-naphthyl or alkyl-β-naphthyl having from 1 to 3 branched or unbranched $C_1$–$C_{16}$-alkyl groups, for example methyl, butyl, octyl, nonyl, decyl, dodecyl or tetradecyl, unsubstituted or $C_1$–$C_{18}$-alkyl-mono-, -di- or -trisubstituted heterocyclic radicals or alkyl radicals substituted by from 1 to 3 heterocyclic radicals, for example 2-[2-(8-heptadecen-1-yl)-4,5-dihydro-1-imidazolyl]ethyl. Heterocyclic radicals include not only cycloaliphatic radicals but also aromatic radicals.

Also of particular interest are mixtures of the aforementioned compounds and in particular mixtures as obtained in the alkoxylation with ethylene oxide and/or propylene oxide of synthetic fatty alcohols from the oxo process or of fatty alcohols of natural raw materials following fat cleavage and reduction. Suitable natural raw materials are coconut oil, palm oil, cottonseed oil, sunflower oil, soybean oil, linseed oil, rape seed oil, tallow and fish oil. Also suitable are the corresponding fatty amine alkoxylates of said natural raw materials, in particular cocoamine, tallowamine or oleylamine.

Particular interest further extends to alkoxylated, higher molecular weight surface-active agents, for example the amino-alkoxylates described in U.S. Pat. No. 3,841,888, the condensation products of phenols, alkanols, alkylene oxide and carboxylic acids described in DE-A72 730 223, the bisphenol derivatives described in U.S. Pat. No. 4,960,935, the condensation products of phenols, formaldehyde, amines and alkylene oxide described in U.S. Pat. No. 3,998,652, and also the water-soluble alkoxylation products described in CA-A-1 158 384, with the exception of those surface-active agents which do not have a cloud point in aqueous solution.

The process of the invention makes it possible to prepare pigments or pigment mixtures of the formula (I). The formula (I) is to be understood as an idealized formula and as also encompassing the corresponding tautomeric compounds and the possible configurational isomers of each tautomeric form. Compounds of the formula (I) are predominantly present in the hydrazone form. The idealized formula (I) therefore encompasses in particular also the bishydrazone form.

The process of the invention is carried out by diazotizing one or more different amines of the formula D-NH$_2$, where D is D$^1$ or D$^2$, and coupling with from 0.45 to 0.55 mol, preferably from 0.5 to 0.53 mol, of one or more different compounds of the formula (II)

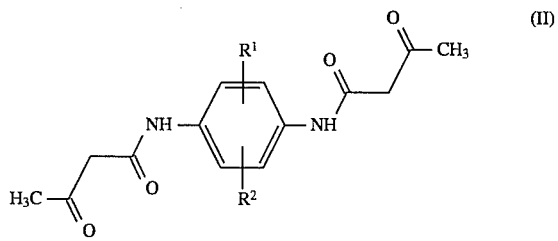

where R$^1$ and R$^2$ are each as defined above, per mole of the total diazonium salts to be reacted.

The process of the invention is preferably carried out by diazotizing an amine of the formula D-NH$_2$ and coupling it with from 0.5 to 0.53 mol, based on 1 mol of the amine D-NH$_2$, of a compound of the formula (II) to obtain pigments of the formula (I) where D$^1$ and D$^2$ have the same meaning.

The process of the invention is carried out in particular by diazotizing an amine of the formula D-NH$_2$ and coupling it with from 0.5 to 0.53 mol, based on 1 mol of the amine D-NH$_2$, of a compound of the formula (III)

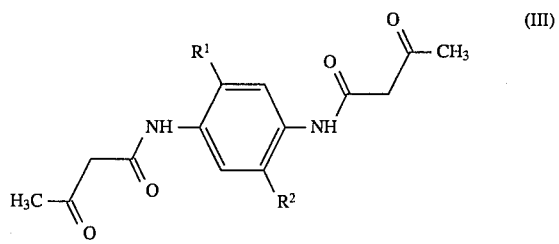

where R$^1$ and R$^2$ are each as defined above but each preferably hydrogen, chlorine, bromine, trifluoromethyl, methyl, ethyl, methoxy, ethoxy, propoxy, butoxy, cyano, nitro, ethoxycarbonyl or methoxycarbonyl.

Suitable diazo components D-NH$_2$ are diazotizable aromatic amines, in particular anilines, aminoanthraquinones and heterocyclic aromatic amines, and the diazotizable amines may each have one or more substituents.

Examples of aromatic amines which are of interest for the process of the invention are aniline and substituted anilines, preferably aniline with from 1 to 3 substituents selected from the group consisting of $C_1$–$C_4$-alkyl, in particular methyl or ethyl, $C_1$–$C_4$-alkoxy, in particular methoxy or ethoxy, phenoxy, halophenoxy, carboxyl, carbalkoxy such as carbomethoxy, carboethoxy, carbopropoxy, carboisopropoxy or carbobutoxy, acyl, in particular acetyl or benzoyl, acyloxy, in particular acetoxy, acylamino, in-particular acetylamino or benzoylamino, unsubstituted or N-mono- or N,N-disubstituted carbamoyl or unsubstituted or N-mono- or N,N-disubstituted sulfamoyl, in which case $C_1$–$C_4$-alkyl or monosubstituted, disubstituted or trisubstituted phenyl or an unsubstituted or substituted aromatic heterocycle come into consideration for use as substituents, $C_1$–$C_4$-alkylamino or phenylamino, $C_1$–$C_4$-alkylsulfonyl or phenylsulfonyl, phenylsulfonylamino, sulfo, cyano, halogen, in particular chlorine or bromine, nitro and trifluoromethyl.

Examples of substituted anilines which are of interest for the process of the invention are 2-, 3- and 4-nitroaniline, 2-, 3- and 4-chloroaniline, 2-, 3- and 4-methylaniline, 2-, 3- and 4-ethylaniline, 2-, 3- and 4-trifluoromethylaniline and 2-, 3- and 4-methoxyaniline, 2,3-, 2,4-, 2,5-, 2,6-, 3,4- and 3,5-dinitroaniline, 2,3-, 2,4-, 2,5-, 2,6-, 3,4- and 3,5-dichloroaniline, 4-chloro-2-nitroaniline, 4-methyl-2-nitroaniline and 4-methoxy-2-nitroaniline, 5-chloro-2-nitroaniline, 5-methyl-2-nitroaniline and 5-methoxy-2-nitroaniline, 2-chloro-4-nitroaniline, 2-methyl-4-nitroaniline and 2-methoxy-4-nitroaniline, 2-chloro-5-nitroaniline, 2-methyl-5-nitroaniline and 2-methoxy-5-nitroaniline, 2-chloro-4-methylaniline and 2-chloro-4-methoxyaniline, 2-chloro-5-methylaniline, 2-chloro-5-methoxyaniline and 2-chloro-5-trifluoromethylaniline, 3-chloro-2-methylaniline and 3-chloro-2-methoxyaniline, 4-chloro-2-methylaniline, 4-chloro-2-methoxyaniline, 4-chloro-2,5-dimethylaniline and 4-chloro-2-trifluoromethylaniline, 5-chloro-3-methylaniline, 5-chloro-3-methoxyaniline, 5-chloro-2-phenoxyaniline and 5-chloro-2-(4-chlorophenoxy)aniline, 2,4,5-, 2,3,4-, 2,3,5-, 2,4,6-, 2,3,6- and 3,4,5-trichloroaniline, 4-phenoxyaniline, 3,5-bis- (trifluoromethyl)aniline, 5-methyl-2-methoxyaniline, 5-methyl-2-methoxyaniline, 4-acetylaminoaniline and 2-chloro-4-methyl-5-acetylaminoaniline, 4-benzoylamino-2,5-dimethoxyaniline, 4-benzoylamino-2-chloro-5-methoxyaniline, 4-benzoylamino-2-methoxy-5-methylaniline and 5-benzoyl-amino-2,4-dimethylaniline, 4-cyano-2,5-dimethoxyaniline and 2-chloro-4-cyano-5-methylaniline, 2-, 3- and 4-aminobenzoic acid, methyl, ethyl, propyl and butyl 2-, 3and 4-aminobenzoate, in particular dimethyl and diethyl 2-aminobenzene-1,4-dicarboxylate (aminoterephthalates), also methyl 4-amino-3-nitrobenzoate, 3-amino-4-methoxy-Nisopropylbenzamide, dimethyl and diethyl 5-aminobenzene-1,3-dicarboxylate (aminoisophthalates), 2-, 3- and 4-aminobenzamide, 3-aminobenzamide with substitution by chlorine, methyl, methoxy or carbomethoxy in the 4-position, and 4-aminobenzamide with substitution by chlorine, methyl, methoxy or carbomethoxy in the 3-position, and also derivatives of the aforementioned benzamides with methyl, ethyl, phenyl, methylphenyl or dimethylphenyl, preferably 2,4-dimethylphenyl, chlorophenyl, dichlorophenyl, in particular 4-chlorophenyl and 2,5-dichlorophenyl, 2-, 3- and 4-carbamoylphenyl, methoxyphenyl, 2-benzothiazolyl or benzimidazol-2-on-5-yl as substituents on the amide nitrogen atom, such as 3-amino-4-chlorobenzamide, 3-amino-4-methylbenzamide, 3-amino-4-methyl-N-methylbenzamide, 3-amino-4-methoxybenzanilide, 3-amino-4-methoxycarbonyl-N-(2,5-dichlorophenyl)benzamide, 3-amino-4-methoxy-N-(4-carbamoylphenyl)benzamide, 3-amino-4-methyl-N-(4-sulfophenyl)benzamide, 4-amino-2,5-dimethoxy-N-(2,4-dimethylphenyl)benzamide, 4-amino-N(2,4-dihydroxyquinazolin-6-yl)benzamide, and 4-amino-N(6-chlorobenzothiazol-2-yl)benzamide,
2-phenylsulfonylaniline, 2-ethylsulfonyl-5-trifluoromethylaniline, 5-ethylsulfonyl-2-methoxyaniline and 5-benzylsulfonyl-2-methoxyaniline, 2-, 3- and 4-aminobenzenesulfonic acid, 2-aminobenzene-1,4-disulfonic acid, 2-amino-4-methylbenzenesulfonic acid, 2-amino-4-chloro-5-methylbenzenesulfonic acid, 2-amino-5-chloro-4-methylbenzenesulfonic acid and 2-amino-5-chloro-4-carboxybenzenesulfonic acid, 2-, 3- and 4-aminobenzenesulfonamide, 4-amino-3-methoxybenzenesulfonamide, 4-amino-2,5-dimethoxybenzenesulfonamide and 4-amino-2-methoxy-5-methylbenzenesulfonamide, and derivatives of the aforementioned benzenesulfonamides with substitution by methyl, ethyl, phenyl, chlorophenyl, dichlorophenyl, methylphenyl, dimethylphenyl or methoxyphenyl on the amide nitrogen atom, such as 3-amino-4-methoxybenzene-N,N-diethylsulfonamide, 3-amino-4-methoxy-benzene-N-butylsulfonamide, 3-amino-2-methylbenzene-N,N-dimethylsulfonamide, 4-amino-2,5-dimethoxybenzenesulfanilide, 4-amino-2,5-dimethoxybenzene-N-methylsulfonamide, 4-amino-2-methoxy-5-methylbenzene-N-methylsulfonamide and 5-amino-2-methylbenzenesulfanilide.

Of interest for the process of the invention are amino-.anthraquinones that are bonded to the nitrogen atom of the azo bridge via the 1- or 2-position, for example unsubstituted aminoanthraquinones or aminoanthraquinones substituted by from 1 to 3 radicals selected from the group consisting of halogen, hydroxyl, nitro, $C_1$–$C_4$-alkyl, carboxyl, acyl, COO-$C_1$–$C_4$-alkyl, CONH$_2$, acylamino, $C_1$–$C_4$-alkoxy, $C_1$–$C_6$-alkylamino, benzylamino, anilino, $C_1$–$C_4$-alkylthio and $C_1$–$C_4$-alkylphenylsulfonylamino, in particular 1-aminoanthraquinone, 2-aminoanthraquinone and substituted aminoanthraquinones, for example 1-amino-2chloroanthraquinone, 1-amino-3-chloroanthraquinone, 1-amino-4-chloroanthraquinone, 1-amino-5-chloroanthraquinone, 1-amino-6-chloroanthraquinone, 1-amino-5,8-dichloroanthraquinone, 1-amino-6,7-dichloroanthraquinone, 1-amino-2-bromoanthraquinone, 1-amino-3-bromoanthraquinone, 1-amino-2,4-dibromoanthraquinone, 1-amino-6-fluoroanthraquinone, 1-amino-7-fluoroanthraquinone, 1-amino-6,7-difluoroanthraquinone, 2-amino-1-chloroanthraquinone, 2-amino-3-chloroanthraquinone, 2-amino-3-bromoanthraquinone, 1-amino-4-nitroanthraquinone, 1-amino-5-nitroanthraquinone, 1-amino-2-methylanthraquinone, 1-amino-2-methyl-4-chloroanthraquinone, 1-amino-2-methyl-4-bromoanthraquinone, 1-aminoanthraquinone-2-carboxylic acid, 1-aminoanthraquinone-2-carboxamide, methyl 1-aminoanthraquinone-2-carboxylate, 1-amino-4-nitroanthraquinone-2-carboxylic acid, 1-amino-2-acetylanthraquinone, 1-amino-4-acetylaminoanthraquinone, 1-amino-5-acetylaminoanthraquinone, 1-amino-5-benzoylaminoanthraquinone, 1-amino-4-benzoylaminoanthraquinone, 1-amino-8-benzoylaminoanthraquinone, 1-amino-4-hydroxyanthraquinone, 1-amino-5-hydroxyanthraquinone, 1-amino-4-methoxyanthraquinone, 1-amino-2-methoxy-4-hydroxyanthraquinone, 1-amino-4-methylaminoanthraquinone, 1-amino-4-benzylaminoanthraquinone, 1-amino-4-cyclohexylaminoanthraquinone, 1-amino-4-anilinoanthraquinone, 1-amino-2-bromo-4-methylthioanthraquinone, 1-amino-4-(4-methyl-phenylsulfonylamino)-2-phenylthioanthraquinone and 1-amino-6-methylthioanthraquinone.

Also of interest for the process of the invention are heterocyclic aromatic amines from the group consisting of benzimidazole, benzimidazolone, benzimidazolethione, benzoxazole, benzoxazolone, benzothiazole, 2-phenylbenzothiazole, benzothiazolone, indazole, phthalimide, naphthalimide, benzotriazole, quinoline, quinazoline, quinazolinone, phthalazine, phthalazinone, benzo[c,d]indolone, benzimidazo[1,2-a]pyrimidone, benzo[e][1,3]oxazinone, dibenzo[a,c]phenazine, quinoxalinone, carbazole and indole, the said heterocycles being unsubstituted or having from 1 to 3 radicals selected from the group consisting of halogen, amino, $C_1$–$C_4$-alkyl, acetamido, carbomethoxyamino, $C_1$–$C_4$-alkoxy, nitro, hydroxyphenyl, phenyl, sulfo and carboxyl as substituent(s), for example 4-amino-6-chlorobenzimidazole, 4-amino-6-chloro-2-methylbenzimidazole, 5-amino-2-acetamidobenzimidazole, 5-amino-2-carbomethoxyaminobenzimidazole, 5-aminobenzimidazol-2-one which may be substituted by chlorine, bromine, nitro, methoxy, ethoxy, carboxy, carboxymethyl or carboxybutyl in the 6-position, 5-aminobenzimidazol-2-one which may be substituted by chlorine, bromine, methyl, ethyl, methoxy or ethoxy in the 7-position, 5-amino-1-methylbenzimidazol-2-one, 5-amino-6-methylbenzimidazol-2-one, 5-amino-4,6-dichlorobenzimidazol-2-one, 5-amino-4,6,7-trichlorobenzimidazol-2-one, 6-amino-4-chloro-5-nitrobenzimidazol-2-one, 7-amino-5-chloro-1-methylbenzimidazol-2-one, 5-amino-6-methylbenzimidazole-2-thione, 5-amino-7-chlorobenzoxazol-2-one, 6-amino-5-chlorobenzoxazol-2-one, 2-amino-6-methoxybenzothiazole, 2-amino-6-ethoxybenzothiazole, 2-amino-6-nitrobenzothiazole, 6-aminobenzothiazole, 6-ammino-2-acetamidobenzothiazole, 2-(4-aminophenyl)-6-methylbenzothiazole, 6-aminobenzothiazol-2-one, 3-amino-6-chloroindazole, 5-aminoindazole, 6-aminoindazole, 5-aminophthalimide, 3-amino-1,8-naphthalimide, 5-amino-2-(2-hydroxyphenyl)benzotriazole, 6-amino-2-hydroxy-4-methylquinoline which may have 5-methyl, 7-chloro, 7-methyl, 7-ethoxy, 8-methyl, 8-methoxy or 8-carboxymethyl as additional substituent, in particular 6-amino-5-chloro-4,8-dimethyl-2-hydroxyquinoline, 6-amino-8- chloro-4,5-dimethyl-2-hydroxyquinoline, 6-amino-5,8-dimethoxy-4-methyl-2-hydroxyquinoline, 6-amino-5-chloro-4-methyl-8-methoxy-2-hydroxyquinoline, 6-amino-4,5,8-trimethyl-2-hydroxyquinoline, 6-amino-5,8-dimethyl-2-hydroxyquinoline, 7-aminoquinoline, 7-amino-2-hydroxyquinoline, 7-amino-2-hydroxy-4-methylquinoline which may have 6-nitro, 6-sulfo, 6-methoxy, 6-isopropoxy, 6-butoxy, 6-methyl, 6-chloro, 5-chloro or 5-methyl as additional substituent, in particular 7-amino-2-hydroxy-4-methylquinoline and 7-amino-2-hydroxy-4-methyl-6-methoxyquinoline, 6-amino-2-methylquinazolin-4-one, 6-aminoquinazoline-2,4-dione, 6-amino-3-methylquinazoline-2,4-dione, 6-amino-7-nitroquinazoline-2,4-dione, 6-amino-7-chloroquinazoline-2,4-dione, 6-amino-8-nitroquinazoline-2,4-dione, 7-aminoquinazoline-2,4-dione and 7-amino-6-nitroquinazoline-2,4-dione, 6-aminophthalazine-1,4-dione, 6-aminoquinoxaline-2,3-dione which may be substituted by chlorine, nitro, methyl, methoxy, ethoxy or carboxyl in the 7-position, in particular 6-amino-5,7-dichloroquinoxaline-2,3-dione and 6-amino-5,7,8-tri-chloroquinoxaline-2,3-dione, 7-amino-5-chloroquinoxaline-2,3-dione and 8-amino-6-chloro-1-methylquinoxaline-2,3-dione, 2-aminocarbazole and aminobenzo[c,d]indol-2-one, 7- and 8-amino-4-methylbenzimidazo[1,2-a]pyrimid-2-one, 6- and 7-aminobenzo[e][1,3]oxazine-2,4-dione, 6- and 7-amino-3-phenylbenzo[e][1,3]oxazine-2,4-dione, 7-aminobenzo[e][1,4]oxazin-3-one and 11-aminodibenzo[a,c]phenazine.

Particularly preferred diazo components D-NH$_2$ for the purposes of the process of the invention are 5-nitro-2-aminoanisole, 4-methyl-2-nitroaniline, 4-nitro-2-aminoanisole, 5-aminobenzimidazol-2-one, dimethyl 2-aminoterephthalate, methyl 4-amino-3-nitrobenzoate, 4-aminobenzamide, anthranilic acid, 3-amino-4-methoxy-N-isopropylbenzamide, 2,4-dichloroaniline, aniline-2,5-disulfonic acid, 3-amino-4-methoxybenzanilide, methyl anthranilate, 2-(4-aminophenyl)-6-methylbenzothiazole and mixtures thereof.

Suitable coupling components for the process of the invention are compounds of the formula (II). Preference is given to using those of the formula (III), for example 1,4-bis(acetoacetylamino)benzene, 2-chloro-1,4-bis(acetoacetylamino)benzene, 2-bromo-1,4-bis(acetoacetylamino)benzene, 2-trifluoromethyl-1,4-bis(acetoacetylamino)benzene, 2-methoxycarbonyl-1,4-bis(acetoacetylamino)benzene, 2-ethoxycarbonyl-1,4-bis(acetoacetylamino)benzene, 2-cyano-1,4-bis(acetoacetylamino)benzene, 2-methyl-1,4-bis(acetoacetylamino)benzene, 2-methoxy-1,4-bis(acetoacetylamino)benzene, 2-ethoxy-1,4-bis(acetoacetylamino)benzene, 2-propoxy-1,4-bis(acetoacetylamino)benzene, 2-isopropoxy-1,4-bis(acetoacetylamino)benzene, 2-butoxy-1,4-bis(acetoacetylamino)benzene, 2-phenoxy-1,4-bis(acetoacetylamino)benzene, 2-nitro-1,4-bis(acetoacetylamino)benzene, 2,5-dimethoxy-1,4-bis(acetoacetylamino)benzene, 2,5-diethoxy-1,4-bis(acetoacetylamino)benzene, 2-ethoxy-5-methoxy-1,4-bis(acetoacetylamino)benzene, 2,5-dichloro-1,4-bis(acetoacetylamino)benzene, 2-chloro-5-methyl-1,4-bis(acetoacetylamino)benzene, 2-chloro-5-methoxy-1,4-bis(acetoacetylamino)benzene, 2-chloro-5-ethoxy-1,4-bis(acetoacetylamino)benzene, 2,5-dimethyl-1,4-bis(acetoacetylamino)benzene, 2-methyl-5-methoxy-1,4-bis(acetoacetylamino)benzene, 2-methyl-5-ethoxy-1,4-bis(acetoacetylamino)benzene, 2-methyl-5-propoxy-1,4-bis(acetoacetylamino)benzene, 2-methyl-5-isopropoxy-1,4-bis(acetoacetylamino)benzene, 2-methyl-5-butoxy-1,4-bis(acetoacetylamino)benzene.

Particularly preferred coupling components for the purposes of the process of the invention are 1,4-bis(acetoacetylamino) benzene, 2,5-dimethyl-1,4-bis(acetoacetylamino)benzene, 2-chloro-1,4-bis-(acetoacetylamino)benzene and 2,5-dichloro-1,4-bis-(acetoacetylamino)benzene.

The coupling reaction is carried out in a conventional manner in an aqueous medium by a) adding a solution of the diazonium salt to a suspension or dispersion of the coupling component, or b) simultaneously metering a solution of the diazonium salt and a solution, suspension or dispersion of the coupling component into a buffer solution or into a mixing nozzle, or c) adding a solution of the coupling component to a solution of the diazonium salt, or d) adding a suspension or dispersion of the coupling component to a solution of the diazonium salt.

The process parameters time, temperature and pH differ only little from those in conventional coupling processes and are thus known to the person skilled in the art.

The process of the invention is in most cases advantageously carried out using the coupling methods b), c) and d), particularly advantageously method d).

It can further be advantageous to carry out the coupling in the presence of customary coupling promoters, for example long-chainamine oxides and phosphine oxides. The use of coupling method d) for the process of the invention in combination with the addition of coupling accelerants, for example long-chain amine oxides, is particularly advantageous, since with this configuration of the process it is possible in the majority of cases to limit the level of monocoupling products to a minimum and so the resulting pigments have application advantages, such as improved light fastness and solvent fastness.

If desired, the process of the invention may include further assistants, such as anionic or cationic surfactants or natural or synthetic resins or resin derivatives. It can also be advantageous in the preparation of disazo pigments to add customary additives, for example those which have a favorable effect on the theological properties of the printing inks prepared from the pigments.

It is frequently advantageous to heat the as-coupled disazo pigments in the reaction mixture for a certain length of time under atmospheric or superatmospheric pressure.

Furthermore, those preparable compounds of the formula (I) according to the invention which contain one or more lakeable acid groups such as sulfo or carboxyl groups can be converted into color lakes in a conventional manner.

The isolation of the pigments prepared according to the invention is effected in a conventional manner, for example by filtering, washing and drying the filter cake.

The pigments prepared by the process of the invention are particularly suitable for preparing printing inks and exhibit excellent properties in respect of the criteria which are important for printing ink pigments, such as transparency, gloss and color strength. Particular preference is given to using the disazo pigments prepared according to the invention for preparing solvent-containing and waterborne intaglio and flexographic printing inks.

The present invention also provides a method for using the compounds of the formula (I) obtained according to the invention for preparing printing inks.

In the Examples which follow, parts by volume bear the same relation to parts by weight as the liter to the kilogram.

EXAMPLE 1

67.3 parts by weight of 5-nitro-2-aminoanisole are stirred in 120 parts by volume of 31% strength hydrochloric acid and 150 parts by volume of water at about 22° C. for two hours. After 300 parts by weight of ice have been added, 57 parts by volume of 38% strength sodium nitrite solution are added dropwise over 15 minutes. The mixture is stirred at from 5° C. to 10° C. for two hours. The diazonium salt solution thus obtained is clarified by filtration and the excess nitrite is destroyed with amidosulfuric acid.

55.3 parts by weight of 1,4-bis(acetoacetylamino)benzene are dissolved in 900 parts by volume of water and 64 parts by volume of 33% strength sodium hydroxide solution and 500 parts by weight of ice are added. The coupling component is precipitated by adding 110 parts by volume of 50% strength acetic acid in the course of one minute.

An azo coupling vessel is charged with the diazonium salt solution, 500 parts by weight of ice and 12.6 parts by weight of a 30% strength aqueous solution of a cocoalkyldimethylamine oxide, and the pH is adjusted to 4.2–4.4 with 200 parts by volume of 4M sodium acetate solution. This mixture is admixed over 45 minutes with the suspension of the coupling component.

After coupling has ended, 25.4 parts by weight of a $C_{12}$–$C_{15}$ fatty alcohol-ethylene oxide-propylene oxide adduct formed from 1 mol of alcohol, 8 mol of ethylene oxide and 4 mol of propylene oxide and having a cloud point in water of 40° C. to 42° C. is added to the pigment suspension and steam is passed in to raise the temperature to 98° C. and to maintain it at that level for 60 minutes. After cooling down to 80° C. the pigment is filtered off with suction and washed with hot water at 80° C. Drying at 65° C. and grinding leaves 149.1 parts by weight of an orange pigment powder.

EXAMPLE 2

Example 1 is repeated with 19.0 parts by weight of the nonionic surfactant, affording 142.3 parts by weight of pigment powder.

EXAMPLE 3

Example 1 is repeated with 12.7 parts by weight of the nonionic surfactant, affording 136.4 parts by weight of pigment powder.

EXAMPLE 4

Example 1 is repeated with 8.9 parts by weight of the nonionic surfactant, affording 133.1 parts by weight of pigment powder.

EXAMPLE 5

Example 1 is repeated with 3.8 parts by weight of the nonionic surfactant, affording 128.3 parts by weight of pigment powder.

EXAMPLES 6 TO 16

Example 2 is repeated with the nonionic surfactant replaced by the nonionic surfactants indicated below in the table.

From 139.8 to 142.9 parts by weight of pigment powder are obtained.

| Example | Noionic surfactant | Cloud point in water | HLB[1] value |
|---|---|---|---|
| 6 | Block polymer of propylene oxide and ethylene oxide (about 10% by weight of EO) | <20° C. | 2 |
| 7 | Block polymer of propylene oxide and ethylene oxide (about 20% by weight of EO) | >35° C. | 4 |
| 8 | Block polymer of propylene oxide and ethylene oxide (about 40% by weight of EO) | >55° C. | 8 |
| 9 | Fatty alcohol polyglycol ether from unsaturated $C_{16}$-$C_{18}$-alcohol (predominantly oleyl alcohol) and about 8 mol of EO | >40° C. | 11 |
| 10 | Fatty alcohol polyglycol ether from isotridecyl alcohol and about 6 mol of EO | >20° C. | 11 |
| 11 | Fatty alcohol polyglycol ether from isotridecyl alcohol and about 8 mol of EO | >45° C. | 13 |
| 12 | Tributylphenol polyglycol ether from tributylphenol and about 6 mol of EO | <20° C. | 10 |
| 13 | Tributylphenol polyglycol ether from tributylphenol and about 11 mol of EO | 42–44° C. | 13 |
| 14 | Tributylphenol polyglycol ether from tributylphenol and about 13 mol of EO | 62–64° C. | 14 |
| 15 | Nonylphenol polyglycol ether from nonylphenol and about 8 mol of EO | 32–34° C. | 12 |
| 16 | Nonylphenol polyglycol ether from nonylphenol and about 11 mol of EO | 71–74° C. | 14 |

[1]Hydrophilic lipophilic balance; EO denotes ethylene oxide

EXAMPLE 17

Example 2 is repeated without cocoalkyldimethylamine oxide. After the suspension of the coupling component has been added, there is still an excess of diazonium salt, which reacts only on addition of 1.6 parts by weight of 1,4-bis(acetoacetylamino)benzene, dissolved in 30 parts by volume of 3% strength sodium hydroxide solution. 141.8 parts by weight of pigment powder are obtained.

EXAMPLE 18

Example 2 is repeated with the nonionic surfactant not added until the pigment suspension is to be filtered, affording 142.6 parts by weight of pigment powder.

EXAMPLE 19

67.3 parts by weight of 5-nitro-2-aminoanisole are stirred in 120 parts by volume of 31% strength hydrochloric acid and 150 parts by volume of water at about 22° C. for two hours. After 300 parts by weight of ice have been added, 57 parts by volume of 38% strength sodium nitrite solution are added dropwise over 15 minutes. The mixture is stirred at from 5° C. to 10° C. for two hours. The diazonium salt solution thus obtained is clarified by filtration and the excess nitrite is destroyed with amidosulfuric acid.

55.3 parts by weight of 1,4-bis(acetoacetylamino)benzene are dissolved in 900 parts by volume of water and 64 parts by volume of 33% strength sodium hydroxide solution and 500 parts by weight of ice are added. The coupling component is precipitated by adding 110 parts by volume of 50% strength acetic acid in the course of one minute.

An azo coupling vessel is charged with the diazonium salt solution, 500 parts by weight of ice and 12.6 parts by weight of a 30% strength aqueous solution of a cocoalkyldimethylamine oxide, and the pH is adjusted to 4.2–4.4 with 200 parts by volume of 4M sodium acetate solution. This mixture is admixed over 45 minutes with the suspension of the coupling component.

After coupling has ended, 19.0 parts by weight of the nonionic surfactant used in Example 1 are added to the pigment suspension and steam is passed in to raise the temperature to 98° C. and hold it at that level for 60 minutes. The reaction mixture is cooled down to 80° C. and adjusted to pH 8 with 55 parts by weight of 33% strength sodium hydroxide solution, an 80° C. solution of 25.4 parts by weight of a disproportionated rosin in 200 parts by volume of water and 16 parts by weight of 33% strength sodium hydroxide solution are added, and the temperature is raised to 98° C. and held at that level for 15 minutes. After cooling down to 80° C. the pH is adjusted to 4.5 with 80 parts by volume of 30% strength hydrochloric acid, and the pigment is filtered off with suction and washed with hot water at 80° C. Drying at 65° C. and grinding leaves 172.8 parts by weight of an orange pigment powder.

EXAMPLE 20

67.3 parts by weight of 5-nitro-2-aminoanisole are stirred in 120 parts by volume of 31% strength hydrochloric acid and 150 parts by volume of water at about 22° C. for two hours. After 300 parts by weight of ice have been added, 57 parts by volume of 38% strength sodium nitrite solution are added dropwise over 15 minutes. The mixture is stirred at from 5° C. to 10° C. for two hours. The diazonium salt solution thus obtained is clarified by filtration and the excess nitrite is destroyed with amidosulfuric acid.

55.3 parts by weight of 1,4-bis(acetoacetylamino)benzene are dissolved in 900 parts by volume of water and 64 parts by volume of 33% strength sodium hydroxide solution and 500 parts by weight of ice are added.

An azo coupling vessel is charged with the diazonium salt solution, 500 parts by weight of ice and 12.6 parts by weight of a 30% strength aqueous solution of a cocoalkyldimethylamine oxide, and the pH is adjusted to 4.2–4.4 with 200 parts by volume of 4M sodium acetate solution. This mixture is admixed over 45 minutes with the solution of the coupling component. The pH of the reaction mixture is held at 4.2–4.4 by adding 50% strength acetic acid. After adding to the suspension of the coupling component there is still an excess of diazonium salt, which does not react until 1.4 parts by weight of 1,4-bis-(acetoacetylamino)benzene, dissolved in 30 parts by volume of 3% strength sodium hydroxide solution, have been added.

After coupling has ended, 19.0 parts by weight of the nonionic surfactant used in Example 1 are added to the pigment suspension and steam is passed in to raise the temperature to 98° C. and hold it at that level for 60 minutes. The reaction mixture is cooled down to 80° C. and adjusted to pH 8 with 55 parts by weight of 33% strength sodium hydroxide solution, an 80° C. solution of 25.4 parts by weight of a disproportionated rosin in 200 parts by volume of water and 16 parts by weight of 33% strength sodium hydroxide solution are added, and the temperature is raised to 98° C. and held at that level for 15 minutes. After cooling down to 80° C. the pH is adjusted to 4.5 with 80 parts by volume of 30% strength hydrochloric acid, and the pigment is filtered off with suction and washed with hot water at 80° C. Drying at 65° C. and grinding leaves 174.2 parts by weight of an orange pigment powder.

EXAMPLE 21

67.3 parts by weight of 5-nitro-2-aminoanisole are stirred in 120 parts by volume of 31% strength hydrochloric acid and 150 parts by volume of water at about 22° C. for two hours. After 300 parts by weight of ice have been added, 57 parts by volume of 38% strength sodium nitrite solution are added dropwise over 15 minutes. The mixture is stirred at from 5° C. to 10° C. for two hours. The diazonium salt solution thus obtained is clarified by afiltration and the excess nitrite is destroyed with amidosulfuric acid.

55.3 parts by weight of 1,4-bis-(acetoacetylamino)benzene are dissolved in 900 parts by volume of water and 64 parts by volume of 33% strength sodium hydroxide solution and 500 parts by weight of ice are added. The coupling component is precipitated by adding 110 parts by volume of 50% strength acetic acid in the course of one minute.

An azo coupling vessel is charged with the suspension of the coupling component and 12.6 parts by weight of a 30% strength aqueous solution of a cocoalkyldimethylamine oxide, and the pH is adjusted to 5.9–6.1 with a 10% strength sodium hydroxide solution. This mixture is admixed over 90 minutes with the aforementioned diazonium salt solution. One hour after the addition has been completed, there is still an excess of diazonium salt, which does not react until 1.5 parts by weight of 1,4-bis(acetoacetylamino)benzene, dissolved in 30 parts by volume of 3% strength sodium hydroxide solution, have been added.

After coupling has ended, 19.0 parts by weight of the nonionic surfactant used in Example 1 are added to the pigment suspension and steam is passed in to raise the temperature to 98° C. and hold it at that level for 60 minutes. The reaction mixture is cooled down to 80° C. and adjusted to pH 8 with 33% strength sodium hydroxide solution, an 80° C. solution of 25.4 parts by weight of a disproportionated rosin in 200 parts by volume of water and 16 parts by weight of 33% strength sodium hydroxide solution are added, and the temperature is raised to 98° C. and held at that level for 15minutes. After cooling down to 80° C. the pH is adjusted to 4.5 with 30% strength hydrochloric acid, and the pigment is filtered off with suction and washed with hot water at 80° C. Drying at 65° C. and grinding leaves 167.3 parts by weight of a reddish yellow pigment powder.

EXAMPLE 22

Example 21 is repeated without cocoalkyldimethylamine oxide. One hour after the addition has been completed, there is still an excess of diazonium salt, which does not react until 1.9 parts by weight of 1,4-bis(acetoacetylamino)benzene, dissolved in 30 parts by volume of 3% strength sodium hydroxide solution, have been added. 162.8 parts by weight of a reddish yellow pigment powder are obtained.

COMPARATIVE EXAMPLE 1

Example 1 is repeated without addition of the $C_{12}$–$C_{15}$ fatty alcohol-ethylene oxide-propylene oxide adduct to the pigment suspension after coupling, affording 126.2 parts by weight of a reddish yellow pigment powder.

COMPARATIVE EXAMPLE 2

30 parts by weight of a pigment prepared as described in Comparative Example 1 are introduced into 500 parts by volume of N-methyl-2-pyrrolidone (NMP) and, with stirring, heated to 120° C. and maintained at that temperature for 3 hours. The pigment is filtered off with suction, washed with NMP and then with acetone and dried. After grinding there are 27.8 parts by weight of a reddish yellow pigment powder.

COMPARATIVE EXAMPLE 3

Example 19 is repeated without the addition of a nonionic surfactant after the coupling has ended, affording 152.6 parts by weight of a reddish yellow pigment powder.

COMPARATIVE EXAMPLE 4

The pigment described in Example 134 of DE-A-24 10 240 (U.S. Pat. No. 3,978,038) is prepared from 5-nitro-2-aminoanisole and 1,4-bis(acetoacetylamino)benzene by the method described in Example 1 of said Offenlegungsschrift. A reddish yellow pigment powder is obtained.

EXAMPLE 23

60.9 parts by weight of 4-methyl-2-nitroaniline are stirred in 120 parts by volume of 31% strength hydrochloric acid and 150 parts by volume of water at about 22° C. for two hours. After 300 parts by weight of ice have been added, 57 parts by volume of 38% strength sodium nitrite solution are added dropwise over 15 minutes. The mixture is stirred at from 5° C. to 10° C. for two hours. The diazonium salt solution thus obtained is clarified by filtration and the excess nitrite is destroyed with amidosulfuric acid.

55.3 parts by weight of 1,4-bis(acetoacetylamino)benzene are dissolved in 900 parts by volume of water and 64 parts by volume of 33% strength sodium hydroxide solution and the solution is admixed with 500 parts by weight of ice. 110 parts by volume of 50% strength acetic acid are added in the course of a minute to precipitate the coupling component.

An azo coupling vessel is charged with the diazonium salt solution, 500 parts by weight of ice, 18.1 parts by weight of the nonionic surfactant used in Example 1 and 6.0 parts by weight of a 30% strength aqueous solution of a cocoalkyldimethylamine oxide, and the pH is adjusted to 4.2–4.4 with 200 parts by volume of 4M sodium acetate solution. This mixture is admixed with the suspension of the coupling component in the course of 60 minutes.

After coupling has ended, steam is introduced to raise the temperature to 98° C. and maintain it there for 60 minutes. The reaction mixture is cooled down to 80° C., adjusted to pH 8 with 55 parts by weight of 33% strength sodium hydroxide solution and admixed with an 80° C. solution of 24.1 parts by weight of a disproportionated rosin in 200 parts by volume of water and 16 parts by weight of 33% strength sodium hydroxide solution, heated to 98° C. and maintained at that level for 15 minutes. After cooling down to 80° C., the pH is adjusted to 4.5 with 80 parts by volume of 30% strength hydrochloric acid, and the pigment is filtered off with suction and washed with 80° C. water. Drying at 65° C. and grinding leaves 159.3 parts by weight of an orange pigment powder.

EXAMPLES 24 TO 27

Example 23 is repeated with the nonionic surfactant being replaced by the following nonionic surfactants:

| Example | Nonionic surfactant | Cloud point in water | HLB value |
|---|---|---|---|
| 24 | Fatty alcohol polyglycol ether from unsaturated $C_{16}$–$C_{18}$-alcohol (predominantly oleyl alcohol) and about 8 mol of EO | >40° C. | 11 |
| 25 | Tributylphenol polyglycol ether from tributylphenyl and about 13 mol of EO | 62–64° C. | 14 |
| 26 | Nonylphenol polyglycol ether from nonylphenol and about 10 mol of EO | 62–65° C. | 13 |
| 27 | $C_{12}$–$C_{14}$-Fatty alcohol-EO-PO adduct from 1 mol of alcohol, 12 mol of EO and 15 mol of PO | 26° C. | |

PO denotes propylene oxide.
From 157.8 to 160.1 parts by weight of pigment powder are obtained.

COMPARATIVE EXAMPLE 5

60.9 parts by weight of 4-methyl-2-nitroaniline are stirred in 120 parts by volume of 31% strength hydrochloric acid and 150 parts by volume of water at about 22° C. for two hours. After 300 parts by weight of ice have been added, 57 parts by volume of 38% strength sodium nitrite solution are added dropwise over 15 minutes. The mixture is stirred at from 5° C. to 10° C. for two hours. The diazonium salt solution thus obtained is clarified by filtration and the excess nitrite is destroyed with amidosulfuric acid.

55.3 parts by weight of 1,4-bis(acetoacetylamino)benzene are dissolved in 900 parts by volume of water and 64 parts by volume of 33% strength sodium hydroxide solution and the solution is admixed with 500 parts by weight of ice. 110 parts by volume of 50% strength acetic acid are added in the course of one minute to precipitate the coupling component.

An azo coupling vessel is charged with the diazonium salt solution, 500 parts by weight of ice, and 6.0 parts by weight of a 30% strength aqueous solution of a cocoalkyldimethylamine oxide, and the pH is adjusted to 4.2–4.4 with 200 parts by volume of 4M sodium acetate solution. This mixture is admixed with the suspension of the coupling component in the course of 60 minutes.

After coupling has ended, steam is introduced to raise the temperature to 98° C. and maintain it there for 60 minutes. After cooling down to 80° C. the pigment is filtered off with suction and washed with 80° C. water. Drying at 65° C. and grinding leaves 119.2 parts by weight of a reddish yellow pigment powder.

COMPARISON EXAMPLE 6

The pigment described in Example 1 of AU 74/71369 is prepared from 4-methyl-2-nitroaniline and 1,4-bis(acetoacetylamino)benzene.

COMPARATIVE EXAMPLE 7

The pigment described in Example 2 of AU 74/71369 is prepared from 4-methyl-2-nitroaniline and 1,4-bis(acetoacetylamino)benzene.

EXAMPLE 28

Example 2 is repeated with the 5-nitro-2-aminoanisole replaced by 4-nitro-2-aminoanisole, affording 144.0 parts by weight of a yellow pigment powder.

COMPARATIVE EXAMPLE 8

Example 28 is repeated without the addition of nonionic surfactant, affording 126.1 parts by weight of a yellow pigment powder.

EXAMPLE 29

59.7 parts by weight of 5-amino-2-benzimidazolone are stirred in 400 parts by volume of acetic acid and 120 parts by volume of 31% strength hydrochloric acid at about 22° C. for two hours. 300 parts by weight of ice are added and 57 parts by volume of 38% strength sodium nitrite solution are added dropwise over 15 minutes. The mixture is stirred at from 5° C. to 10° C. for two hours. The diazonium salt solution thus obtained is clarified by filtration and the excess nitrite is destroyed with amidosulfuric acid.

55.3 parts by weight of 1,4-bis(acetoacetylamino)benzene are dissolved in 900 parts by volume of water and 64 parts by volume of 33% strength sodium hydroxide solution and the solution is mixed with 500 parts by weight of ice. 110 parts by volume of 50% strength acetic acid are added in the course of one minute to precipitate the coupling component.

An azo coupling vessel is charged with the suspension of the coupling component and 25.2 parts by weight of a 30% strength aqueous solution of a cocoalkyldimethylamine oxide and the pH is adjusted to 6.5 with a 10% strength sodium hydroxide solution. This mixture is admixed with the abovementioned diazonium salt solution in the course of 2 hours while the pH is maintained at from 6.5 to 7.0 with a 10% strength sodium hydroxide solution. One hour after the addition has ended, there is still an excess of diazonium salt, which does not react until 1.7 parts by weight of 1,4-bis(acetoacetylamino)benzene, dissolved in 30 parts by volume of 3% strength sodium hydroxide solution, have been added.

After coupling has ended, 17.9 parts by weight of the nonionic surfactant used in Example 1 are added to the pigment suspension, and steam is introduced to raise the temperature to 98° C. and maintain it at that level for 60 minutes. The reaction mixture is cooled down to 80° C., the pH is adjusted to 8 with 33% strength sodium hydroxide solution, and an 80° C. solution of 23.8 parts by weight of a disproportionated rosin in 200 parts by volume of water and 16 parts by weight of 33% strength sodium hydroxide solution are added, and the temperature is raised to 98° C. and maintained there for 15 minutes. After cooling to 80° C. the pH is adjusted to 4.5 with 30% strength hydrochloric acid, and the pigment is filtered off with suction and washed with 80° C. water. Drying at 65° C. and grinding leaves 156.6 parts by weight of an orange pigment powder.

COMPARATIVE EXAMPLE 9

Example 29 is repeated without the addition of a nonionic surfactant, affording 115.8 parts by weight of a brownish yellow pigment powder.

EXAMPLE 30

83.6 parts by weight of dimethyl 2-aminoterephthalate are stirred in 120 parts by volume of 31% strength hydrochloric acid, 90 parts by volume of acetic acid and 60 parts by volume of water at about 22° C. for two hours. After 50 parts by weight of ice have been added, 57 parts by volume of 38% strength sodium nitrite solution are added dropwise over 15 minutes. The mixture is stirred at from 0° C. to 5° C. for two hours (external cooling). The diazonium salt solution thus obtained is clarified by filtration and the excess nitrite is destroyed with amidosulfuric acid.

55.3 parts by weight of 1,4-bis(acetoacetylamino)benzene are dissolved in 900 parts by volume of water and 64 parts by volume of 33% strength sodium hydroxide solution and the solution is admixed with 500 parts by weight of ice. 110 parts by volume of 50% strength acetic acid are added in the course of one minute to precipitate the coupling component.

An azo coupling vessel is charged with the diazonium salt solution, 500 parts by weight of ice and 14.2 parts by weight of a 30% strength aqueous solution of a cocoalkyldimethylamine oxide and the pH is adjusted to 4.2–4.4 with 200 parts by volume of 4M sodium acetate solution. This mixture is mixed with the suspension of the coupling component in the course of 45 minutes.

After coupling has ended, 21.4 parts by weight of the nonionic surfactant used in Example 1 are added to the pigment suspension, and steam is introduced to raise the temperature to 98° C. and maintain it at that level for 2 hours. After cooling to 80° C., the pigment is filtered off with suction and washed with 80° C. water. Drying at 65° C. and grinding leaves 156.6 parts by weight of a yellow pigment powder.

COMPARATIVE EXAMPLE 10

A pigment is prepared from dimethyl 2-aminoterephthalate and 1,4-bis(acetoacetylamino)benzene in the manner described in Example 1 of GB-A-22 39 254.

EXAMPLE 31

78.4 parts by weight of methyl 4-amino-3-nitrobenzoate are stirred in 640 parts by volume of acetic acid and 120 parts by volume of 31% strength hydrochloric acid at about 22° C. for two hours. 57 parts by volume of 38% strength sodium nitrite solution are added dropwise at from 5° C. to 10° C. (external cooling) in the course of 15 minutes. The mixture is stirred at 5° C. to 10° C. for two hours. The diazonium salt solution thus obtained is clarified by filtration and the excess nitrite is destroyed with amidosulfuric acid.

55.3 parts by weight of 1,4-bis(acetoacetylamino) benzene are dissolved in 900 parts by volume of water and 64 parts by volume of 33% strength sodium hydroxide solution, and the solution is admixed with 500 parts by weight of ice.

An azo coupling vessel is charged with the diazonium salt solution, 500 parts by weight of ice and 12.6 parts by weight of a 30% strength aqueous solution of a cocoalkyldimethylamine oxide. This mixture is admixed with the solution of the coupling component in the course of 35 minutes. Then the pH of the reaction mixture is adjusted to 3.9 with 4M sodium acetate solution.

After coupling has ended, 20.7 parts by weight of the nonionic surfactant used in Example 1 are added to the pigment suspension, and steam is introduced to raise the temperature to 90° C. and maintain it at that level for 60 minutes. After cooling to 80° C., the pigment is filtered off with suction and washed with 80° C. water. Drying at 65° C. and grinding leaves 159.1 parts by weight of a yellow pigment powder.

COMPARATIVE EXAMPLE 11

The pigment described in Example 3 of 2A-A-11 35 688 is prepared from methyl 4-amino-3-nitrobenzoate and 1,4-bis(acetoacetylamino) benzene by the method described in Example 1 of said publication.

COMPARATIVE EXAMPLE 12

Comparative Example 11 is repeated without the aftertreatment of the pigment press cake in dimethylformamide.

COMPARATIVE EXAMPLE 13

Example 31 is repeated without the addition of a nonionic surfactant after coupling has ended. Drying and grinding gives 135.7 parts by weight of a yellow pigment.

EXAMPLE 32

54.5 parts by weight of 4-aminobenzamide are stirred in 800 parts by volume of water and 112 parts by volume of 31% strength hydrochloric acid at about 22° C. for two hours. After 140 parts by weight of ice have been added, 57 parts by volume of 38% strength sodium nitrite solution are added dropwise in the course of 15 minutes. The mixture is stirred at from 5° C. to 10° C. for two hours. The diazonium salt solution thus obtained is clarified by filtration and the excess nitrite is destroyed with amidosulfuric acid.

55.3 parts by weight of 1,4-bis(acetoacetylamino)benzene are dissolved in 900 parts by volume of water and 64 parts by volume of 33% strength sodium hydroxide solution and the solution is admixed with 500 parts by weight of ice. 110 parts by volume of 50% strength acetic acid are added in the course of one minute to precipitate the coupling component.

An azo coupling vessel is charged with the diazonium salt solution, 200 parts by weight of ice, 300 parts by weight of water and 12.6 parts by weight of a 30% strength aqueous solution of a cocoalkyldimethylamine oxide and the pH is adjusted to 4.2–4.4 with 4M sodium acetate solution. This mixture is admixed with the suspension of the coupling component in the course of 2 hours. This is followed by further stirring at 20° C. for 30 minutes and, after heating to 40° C., for a further 30 minutes. After coupling has ended, 17.1 parts by weight of the nonionic surfactant used in Example 1 are added to the pigment suspension, and steam is introduced to raise the temperature to 98° C. and maintain it there for one hour. After cooling down to 80° C., the pigment is filtered off with suction and washed with 80° C. water. Drying at 65° C. and grinding leaves 126.4 parts by weight of a greenish yellow pigment.

COMPARATIVE EXAMPLE 14

Example 32 is repeated without the addition of a nonionic surfactant, affording 110.2 parts by weight of a greenish yellow pigment powder.

EXAMPLE 33

76.0 parts by weight of dimethyl 2-aminoterephthalate and 6.1 parts by weight of methyl anthranilate are stirred in 100 parts by volume of 31% strength hydrochloric acid and 10 parts by volume of water at about 22° C. for four hours. With external cooling and the addition of 125 parts by weight of ice the mixture is cooled to 0° C. and 57 parts by volume of 38% strength sodium nitrite solution are added dropwise over 15 minutes. The mixture is stirred at from 0° C. to 5° C. for two hours. The diazonium salt solution thus obtained is clarified by filtration and the excess nitrite is destroyed with amidosulfuric acid.

55.3 parts by weight of 1,4-bis(acetoacetylamino)benzene are dissolved in 900 parts by volume of water and 64 parts by volume of 33% strength sodium hydroxide solution and the solution is admixed with 500 parts by weight of ice. 110 parts by volume of 50% strength acetic acid are added in the course of one minute to precipitate the coupling component.

An azo coupling vessel is charged with the diazonium salt solution, 500 parts by weight of ice and 12.6 parts by weight of a 30% strength aqueous solution of a cocoalkyldimethylamine oxide and the pH is adjusted to 4.2–4.4 with 200 parts by volume of 4M sodium acetate solution. This mixture is admixed with the suspension of the coupling component in the course of 45 minutes.

After coupling has ended, 21.4 parts by weight of the nonionic surfactant used in Example 1 are added to the pigment suspension, and steam is introduced to raise the temperature to 98° C. and maintain it there for 120 minutes. After cooling to 80° C., the pigment is filtered off with suction and washed with 80° C. water. Drying at 65° C. and grinding leaves 158.6 parts by weight of a yellow pigment powder.

COMPARATIVE EXAMPLE 15

The pigment of the example given in U.S. Pat. No. 5,030,247 is prepared from dimethyl 2-aminoterephthalate, methyl anthranilate and 1,4-bis(acetoacetylamino)benzene without aftertreating the crude pigment in an organic solvent.

COMPARATIVE EXAMPLE 16

30.0 parts by weight of the pigment of Comparative Example 15, added to 600 parts by volume of dimethylformamide, are heated to 150° C. and maintained at that temperature for 2 hours. After cooling down to 80° C. the pigment is filtered off with suction, washed with dimethylformamide and then with ethanol, dried and ground, leaving 26.4 parts by weight of a yellow pigment.

EXAMPLE 34

Example 2 is repeated with the 67.3 parts by weight of 5-nitro-2-aminoanisole replaced by a mixture of 60.6 parts by weight of 5-nitro-2-aminoanisole and 6.1 parts by weight of 4-methyl-2-nitroaniline, affording 141.1 parts by weight of an orange pigment.

COMPARATIVE EXAMPLE 17

Comparative Example 1 is repeated with the 67.3 parts by weight of 5-nitro-2-aminoanisole replaced by a mixture of 60.6 parts by weight of 5-nitro-2-aminoanisole and 6.1 parts by weight of 4-methyl-2-nitroaniline, affording 125.7 parts by weight of a reddish yellow pigment.

EXAMPLE 35

Example 2 is repeated with the 55.3 parts by weight of 1,4-bis(acetoacetylamino)benzene replaced by a mixture of 49.7 parts by weight of 1,4-bis(acetoacetylamino)benzene and 6.1 parts by weight of 2,5-dimethyl 1,4-bis(acetoacetylamino)benzene, affording 142.4 parts by weight of an orange pigment.

COMPARATIVE EXAMPLE 18

Comparative Example 1 is repeated with the 55.3 parts by weight of 1,4-bis(acetoacetylamino) benzene replaced by a mixture of 49.7 parts by weight of 1,4-bis(acetoacetylamino) benzene and 6.1 parts by weight of 2,5-dimethyl-1,4-bis(acetoacetylamino)benzene, affording 126.1 parts by weight of an orange pigment.

EXAMPLE 36

Example 2 is repeated with the 55.3 parts by weight of 1,4-bis(acetoacetylamino)benzene replaced by 62.1 parts by weight of 2-chloro-1,4-bis(acetoacetylamino)benzene, affording 151.0 parts by weight of a reddish yellow pigment.

COMPARATIVE EXAMPLE 19

Comparative Example 1 is repeated with the 55.3 parts by weight of 1,4-bis(acetoacetylamino)benzene replaced by 62.1 parts by weight of 2-chloro-1,4-bis(acetoacetylamino)benzene, affording 131.8 parts by weight of a brownish yellow pigment.

COMPARATIVE EXAMPLE 20

30.0 parts by weight of the pigment of Comparative Example 19, added to 600 parts by volume of dimethylformamide, are heated to 150° C. and maintained at that temperature for 30 minutes. After cooling down to 80° C., the pigment is filtered off with suction, washed with dimethylformamide and then with ethanol, dried and ground, leaving 23,6 parts by weight of a reddish yellow pigment.

EXAMPLE 37

54.5 parts by weight of 4-aminobenzamide are stirred in 800 parts by volume of water and 112 parts by volume of 31% strength hydrochloric acid at about 22° C. for two hours. After 140 parts by weight of ice have been added, 57 parts by volume of 38% strength sodium nitrite solution are added dropwise in the course of 15 minutes. The mixture is stirred at from 5° C. to 10° C. for two hours. The diazonium salt solution thus obtained is clarified by filtration and the excess nitrite is destroyed with amidosulfuric acid.

62.1 parts by weight of 2-chloro-1,4-bis(acetoacetylamino)benzene are dissolved in 900 parts by volume of water and 64 parts by volume of 33% strength sodium hydroxide solution and the solution is admixed with 500 parts by weight of ice.

An azo coupling vessel is charged with the diazonium salt solution, 200 parts by weight of ice, 300 parts by weight of water and 12.6 parts by weight of a 30% strength aqueous solution of a cocoaikyldimethylamine oxide and the pH is adjusted to 4.2–4.4 with 4M sodium acetate solution. This mixture is admixed with the solution of the coupling component in the course of 2 hours. This is followed by further stirring at 20° C. for 30 minutes and, after heating to 40° C., for a further 30 minutes.

After coupling has ended, 17.6 parts by weight of the nonionic surfactant used in Example 1 are added to the pigment suspension, and steam is introduced to raise the temperature to 98° C. and maintain it there for one hour. After cooling down to 80° C. the pigment is filtered off with suction and washed with 80° C. water. Drying at 65° C. and grinding leaves 134.8 parts by weight of a greenish yellow pigment.

COMPARATIVE EXAMPLE 21

Example 37 is repeated without the addition of a nonionic surfactant after coupling has ended. Drying and grinding leaves 116.4 parts by weight of greenish yellow pigment.

COMPARATIVE EXAMPLE 22

30.0 parts by weight of the pigment of Comparative Example 21, added to 600 parts by volume of dimethylformamide, are heated to 150° C. and held at that temperature for 10 minutes. After cooling down to 80° C., the pigment is filtered off with suction, washed with dimethylformamide and then with ethanol, dried and ground, leaving 22.0 parts by weight of a greenish yellow pigment.

EXAMPLE 38

83.6 parts by weight of dimethyl 2-aminoterephthalate are stirred in 120 parts by volume of 31% strength hydrochloric acid, 90 parts by volume of acetic acid and 60 parts by volume of water at about 22° C. for two hours. After 50 parts by weight of ice have been added, 57 parts by volume of 38% strength sodium nitrite solution are added dropwise over 15 minutes. The mixture is stirred at from 0° C. to 5° C. for two hours (external cooling). The diazonium salt solution thus obtained is clarified by filtration and the excess nitrite is destroyed with amidosulfuric acid.

62.1 parts by weight of 2-chloro-1,4-bis(acetoacetylamino)benzene are dissolved in 900 parts by volume of water and 64 parts by volume of 33% strength sodium hydroxide solution and the solution is admixed with 500 parts by weight of ice.

An azo coupling vessel is charged with the diazonium salt solution, 200 parts by weight of ice, 300 parts by weight of water and 12.6 parts by weight of a 30% strength aqueous solution of a cocoalkyldimethylamine oxide and the pH is adjusted to 4.2–4.4 with 4M sodium acetate solution. This mixture is mixed with the solution of the coupling component in the course of 2 hours.

After coupling has ended, 22.5 parts by weight of the nonionic surfactant used in Example 1 are added to the pigment suspension, and steam is introduced to raise the temperature to 98° C. and maintain it at that level for one hour. After cooling to 80° C., the pigment is filtered off with suction and washed with 80° C. water. Drying at 65° C. and grinding leaves 169.7 parts by weight of a greenish yellow pigment.

COMPARISON EXAMPLE 23

Example 38 is repeated without the addition of a nonionic surfactant after coupling has ended. Drying and grinding leaves 148.1 parts by weight of a greenish yellow pigment.

EXAMPLE 39

4.8 parts by weight of anthranilic acid are stirred in 800 parts by volume of water and 112 parts by volume of 31% strength hydrochloric acid at about 22° C. for two hours. After 140 parts by weight of ice have been added, 57 parts by volume of 38% strength sodium nitrite solution are added dropwise over 15 minutes. The mixture is stirred at from 5° C. to 10° C. for one hour. The diazonium salt solution thus obtained is clarified by filtration and excess nitrite is destroyed with amidosulfuric acid.

55.3 parts by weight of 1,4-bis(acetoacetylamino)benzene are dissolved in 900 parts by volume of water and 64 parts by volume of 33% strength sodium hydroxide solution and the solution is admixed with 500 parts by weight of ice. 110 parts by volume of 50% strength acetic acid are added in the course of one minute to precipitate the coupling component.

An azo coupling vessel is charged with the diazonium salt solution, 200 parts by weight of ice, 300 parts by weight of water and 12.6 parts by weight of a 30% strength aqueous solution of a cocoalkyldimethylamine oxide and the pH is adjusted to 4.2–4.4 with 4M sodium acetate solution. This mixture is admixed with the suspension of the coupling component in the course of 2 hours.

After coupling has ended, 17.2 parts by weight of the nonionic surfactant used in Example 1 are added to the pigment suspension, and steam is introduced to raise the temperature to 98° C. and maintain it there for one hour. After cooling to 80° C., the pigment is filtered off with suction and washed with 80° C. water. Drying at 65° C. and grinding leaves 127.3 parts by weight of a yellow pigment.

COMPARATIVE EXAMPLE 24

Example 39 is repeated without the addition of a nonionic surfactant after coupling has ended. Drying and grinding leaves 113.1 parts by weight of a yellow pigment.

COMPARATIVE EXAMPLE 25

40.0 parts by weight of the pigment of Comparative Example 24, added to 600 parts by volume of dimethylformamide, are heated to 135° C. and maintained at that temperature for 60 minutes. After cooling down to 80° C., the pigment is filtered off with suction, washed with dimethylformamide and then with ethanol, dried and ground, leaving 32.7 parts by weight of a yellow pigment.

EXAMPLE 40

Example 1 is repeated with 83.3 parts by weight of 3-amino-4-methoxy-N-isopropylbenzamide as well as 55.3 parts by weight of 1,4-bis(acetoacetylamino)benzene and with the 21.4 parts by weight of the nonionic surfactant, affording 162.8 parts by weight of a greenish yellow pigment.

COMPARATIVE EXAMPLE 26

Example 40 is repeated without the addition of a nonionic surfactant after coupling has ended. Drying and grinding leaves 138.8 parts by weight of a greenish yellow pigment.

COMPARATIVE EXAMPLE 27

40.0 parts by weight of the pigment of Comparative Example 26, added to 600 parts by volume of dimethylformamide, are heated to 135° C. and maintained at that temperature for 90 minutes. After cooling down to 80° C., the pigment is filtered off with suction, washed with dimethylformamide and then with ethanol, dried and ground, leaving 34.1 parts of a greenish yellow pigment.

EXAMPLE 41

Example 1 is repeated with 64.8 parts by weight of 2,4-dichloroaniline as well as 55.3 parts by weight of 1,4bis-(acetoacetylamino)benzene and with 18.7 parts by weight of the nonionic surfactant, affording 141.1 parts by weight of a greenish yellow pigment.

COMPARATIVE EXAMPLE 28

Example 41 is repeated without the addition of a nonionic surfactant after coupling has ended. Drying and grinding leaves 122.2 parts by weight of a greenish yellow pigment.

COMPARATIVE EXAMPLE 29

30.0 parts by weight of the pigment of Comparative Example 28, added to 600 parts by volume of dimethylformamide, are heated to 125° C. and maintained at that temperature for 15 minutes. After cooling down to 80° C., the pigment is filtered off with suction, washed with dimethylformamide and then with ethanol, dried and ground, leaving 24.2 parts by weight of a greenish yellow pigment.

COMPARATIVE EXAMPLE 30

The pigment described in Example 24 of U.S. Pat. No. 3,759,733 is prepared from 2,4-dichloroaniline, aniline-2,5-disulfonic acid and 1,4-bis(acetoacetylamino)benzene by the method indicated there.

EXAMPLE 42

69.0 parts by weight of 2-chloro-4-nitroaniline are diazotized by the method described in Example 1 for 5-nitro-2-aminoanisole.

55.3 parts by weight of 1,4-bis(acetoacetylamino) benzene are dissolved in-900 parts by volume of water and 64 parts by volume of 33% strength sodium hydroxide solution, and the solution is mixed with 19.3 parts of the nonionic surfactant used in Example 1.

An azo coupling vessel is charged with the diazonium salt solution, 400 parts by weight of ice, 300 parts by weight of water and 12.6 parts by weight of a 30% strength aqueous solution of a cocoalkyldimethylamine oxide and the pH is adjusted to 3.5 with 4N sodium acetate solution. This mixture is admixed with the solution of the coupling component in the course of 45 minutes.

After coupling has ended, steam is introduced to raise the temperature to 98° C. and keep it there for two hours.

After cooling down to 80° C., the pigment is filtered off with suction and washed with 80° C. water. Drying at 65° C. and grinding leaves 144.7 parts by weight of pigment.

COMPARATIVE EXAMPLE 31

The pigment described in Example 1 of U.S. Pat. No. 3,978,038 is prepared from 69.0 parts by weight of 2-chloro-4-nitroaniline and 55.3 parts by weight of 1,4-bis(acetoacetylamino)benzene. 120.2 parts are obtained of the pigment. 25 parts by weight of this pigment are as in Example 1 of U.S. Pat. No. 3,978,038 stirred in 670 parts by volume of dimethylformamide at 140°–150° C. for 2 hours, filtered, and washed with hot dimethylformamide, then with methanol and finally with hot water. Drying and grinding leaves 22.7 parts by weight of pigment powder.

EXAMPLE 43

60.0 parts by weight of 4-aminoacetanilide are diazotized in the manner described in Example 1 for 5-nitro-2-aminoanisole.

55.3 parts by weight of 1,4-bis(acetoacetylamino)benzene are dissolved in 900 parts by volume of water and 64 parts by volume of 33% strength sodium hydroxide solution, and the solution is mixed with 500 parts by weight of ice and 24.0 parts by weight of the nonionic surfactant used in Example 1.

An azo coupling vessel is charged with the diazonium salt solution, 500 parts by weight of ice, 300 parts by weight of water and 12.6 parts by weight of a 30% strength aqueous solution of a cocoalkyldimethylamine oxide and the pH is adjusted to 4.4 with 4N sodium acetate solution. This mixture is admixed with the solution of the coupling component in the course of 45 minutes. After coupling has ended, steam is introduced to raise the temperature to 98° C. and keep it there for four hours. After cooling down to 80° C., the pigment is filtered off with suction and washed with 80° C. water. Drying at 65° C. and grinding leaves 140.8 parts by weight of pigment.

COMPARATIVE EXAMPLE 32

Example 43 is repeated without the addition of a nonionic surfactant after coupling has ended, affording 117.9 parts by weight of pigment powder.

EXAMPLE 44

Example 37 is repeated with the 62.1 parts by weight of 2-chloro-1,4-bis(acetoacetylamino)benzene replaced by 69.0 parts by weight of 2,5-dichloro-1,4-bis(acetoacetylamino)benzene and the 17.6 parts by 25.4 parts by weight of the nonionic surfactant, affording 147.4 parts by weight of a greenish yellow pigment.

COMPARATIVE EXAMPLE 33

Example 44 is repeated without the addition of a nonionic surfactant after coupling has ended, affording 124.9 parts by weight of pigment powder.

COMPARATIVE EXAMPLE 34

30.0 parts by weight of the pigment of Comparative Example 33, added to 600 parts by volume of dimethylformamide, are heated to 150° C. and maintained at that temperature for 45 minutes. After cooling down to 80° C., the pigment is filtered off with suction, washed with dimethylformamide and then with ethanol, dried and ground, leaving 27.1 parts by weight of a greenish yellow pigment.

EXAMPLE 45

96.9 parts by weight of 3-amino-4-methoxybenzanilide are diazotized in the manner described in Example 39 for anthranilic acid.

The rest of the procedure is as described in Example 39, except that 23.5 parts by weight of the nonionic surfactant are used. 172.8 parts by weight of a yellow pigment are obtained.

COMPARATIVE EXAMPLE 35

Example 45 is repeated without a nonionic surfactant, affording 153.4 parts by weight of a yellow pigment.

EXAMPLE 46

Example 45 is repeated with the 96.9 parts by weight of 3-amino-4-methoxybenzanilide replaced by 60.5 parts by weight of methyl anthranilate and the 23.5 parts by weight of the nonionic surfactant by 18.0 parts, affording 133.7 parts by weight of a yellow pigment.

COMPARATIVE EXAMPLE 36

Example 46 is repeated without a nonionic surfactant, affording 118.1 parts by weight of a yellow pigment.

EXAMPLE 47

96.0 parts by weight of 2-(4-aminophenyl)-6-methylbenzothiazole are stirred in 120 parts by volume of 31% strength hydrochloric acid and 200 parts by volume of glacial acetic acid at about 22° C. for two hours. After 1000 parts by volume of water and 300 parts by weight of ice have been added, 57 parts by volume of 38% strength sodium nitrite solution are added dropwise in the course of 15 minutes. The mixture is subsequently stirred at from 5° C. to 10° C. for two hours. The diazonium salt solution thus obtained is clarified by filtration and the excess nitrite is destroyed with amidosulfuric acid.

55.3 parts by weight of 1,4-bis(acetoacetylamino)benzene are dissolved in 900 parts by volume of water and 64 parts by volume of 33% strength sodium hydroxide solution and the solution is admixed with 500 parts by weight of ice. 110 parts by volume of 50% strength acetic acid are added in the course of one minute to precipitate the coupling component.

An azo coupling vessel is charged with the diazonium salt solution, 500 parts by weight of ice and 15.6 parts by weight of a 30% strength aqueous solution of a cocoalkyldimethylamine oxide and the pH is adjusted to 4.0 with about 200 parts by volume of 4N sodium acetate solution. This mixture is admixed with the suspension of the coupling component in the course of 45 minutes. After coupling has ended, 23.3 parts by weight of a $C_{12}$–$C_{13}$-fatty alcohol-ethylene oxide-propylene oxide adduct of 1 mol of alcohol and 8 mol of ethylene oxide and also 4 mol of propylene oxide and having a cloud point in water of from 40° to 42° C. are added to the pigment suspension, and steam is introduced to raise the temperature to 98° C. and maintain it there for 60 minutes. After cooling down to 80° C. the pigment is filtered off with suction and washed with 80° C. water. Drying at 65° C. and grinding leaves 173.7 parts by weight of a reddish yellow pigment powder.

COMPARATIVE EXAMPLE 37

Example 47 is repeated without the addition of a nonionic surfactant after the coupling has ended, affording 152.1 parts by weight of a yellow pigment powder.

Use examples

Preparation of intaglio printing inks in a Paint Shaker and subsequent application to a print medium.

1. Varnish

| | |
|---|---|
| 30.0% | of collodion wool A 400 (65% ethanol moist) |
| 4.0% | of plasticizer, for example dibutyl phthalate |
| 8.0% | of methoxypropanol |
| 58.0% | of ethanol (anhydrous) |
| 100.0% | (solids content 23.5%) |

2. Solvent mixture

50% of ethanol

50% of ethyl acetate

Sample and comparison are each made into 2 inks by the following method:

A 150 ml plastic cup with a push-on lid is filled with 113 g of glass balls (2 mm diameter) and 5.4 g of pigment
    15.0 g of nitrocellulose (NC) varnish (1.)
    15.6 g of the solvent mixture (2.)

36.0 g (amounting to a 15% strength millbase).

2 cups each of sample and comparison are shaken simultaneously on the paint shaker for 30 minutes.

3. Each cup of sample and comparison is then supplemented with 9.0 g of NC varnish (1.)

and further shaken for 2 minutes. These now 12% strength concentrates are introduced via a sieve into a glass bottle and used for measuring the viscosity.

4. The remaining two cups of sample and comparison are each supplemented with 32.0 g of NC varnish (1.) and 4.0 g of methoxypropanol and shaken for a further 2 minutes. These now 7.5% strength ready-prepared printing inks are separated from the glass balls and introduced into a glass bottle. Before printing, the ink is left to stand for 10 minutes to allow air bubbles to escape.

5. Printing

The above-described 7.5% strength printing inks are printed with an intaglio test printing press once on paper and once on polypropylene (PP) film with the sample and the comparison being printed side by side on the same medium.

Each print is immediately after printing placed for some seconds onto a hot plate at 60° C. to prevent blushing of the print.

6. Viscosity measurement

The viscosity is measured on the above-described 12% strength concentrates (using for example a ®Rotovisko RV3 or RV1 2 or a ®Viskotester VT 500 from Haake, Karlsruhe).

7. Assessment

The print-on paper is used to assess color strength, hue, cleanness and—from the print on top of black —the transparency.

The print on the PP film (underlaid with paper) or aluminum foil is used to assess gloss and transparency.

If the color strength of the two inks differs by more than 5%, the stronger ink (sample or comparison) is appropriately reduced with varnish (1.) (for example to 95 parts, 90 parts, etc.) and again printed against the 2nd ink.

The pigments of the examples and comparative examples are made into printing inks by the above-described method, and these printing inks are used to produce prints. The table below shows how the prints produced from pigments of the examples (column 2) rate in a coloristic comparison (column 3) against the prints produced from the corresponding pigments of the comparative examples (column 4).

| Coloration example | Pigment of example | Coloristic assessment | Pigment of comparative example |
|---|---|---|---|
| 1 | 1 | significantly greener, more transparent and glossier; markedly cleaner | 1 |
| 2 | 2 | distinctly greener, more transparent and glossier, somewhat cleaner | 1 |
| 3 | 3 | markedly greener, more transparent and glossier | 1 |
| 4 | 4 | markedly greener, more transparent and glossier | 1 |
| 5 | 5 | somewhat glossier and more transparent | 1 |
| 6–16 | 6–16 | markedly to distinctly greener, more transparent and glossier; somewhat to markedly cleaner | 1 |
| 17 | 18 | markedly greener, more transparent and glossier; somewhat cleaner | 1 |
| 18 | 19 | distinctly greener, more transparent and glossier; somewhat cleaner | 1 |
| 19 | 20 | markedly to distinctly greener, more transparent and glossier; somewhat cleaner | 1 |
| 20 | 19 | substantially greener, somewhat cleaner, significantly more transparent | 2 |
| 21 | 19 | distinctly to significantly greener, more transparent and glossier | 3 |
| 22 | 19 | substantially more transparent; significantly greener and glossier; markedly cleaner | 4 |
| 23–27 | 23–27 | substantially glossier, significantly greener and more transparent; markedly cleaner | 5 |
| 28 | 23 | significantly more transparent; markedly greener, cleaner and glossier | 6 |
| 29 | 23 | significantly more transparent; markedly greener, cleaner and glossier | 7 |
| 30 | 28 | markedly more transparent; distinctly glossier | 8 |
| 31 | 29 | distinctly more transparent; markedly glossier; somewhat cleaner | 9 |
| 32 | 30 | significantly more transparent; markedly to distinctly glossier; somewhat duller | 10 |
| 33 | 31 | significantly more transparent; markedly glossier | 11 |
| 34 | 31 | distinctly more transparent and glossier; markedly greener and cleaner | 12 |
| 35 | 31 | distinctly cleaner; markedly to distinctly more transparent and glossier | 13 |
| 36 | 32 | markedly more transparent and glossier | 14 |
| 37 | 33 | distinctly more transparent, somewhat matter | 16 |
| 38 | 34 | distinctly more transparent; markedly glossier; somewhat greener | 17 |
| 39 | 35 | markedly to distinctly more transparent and glossier; markedly greener; somewhat cleaner | 18 |
| 40 | 36 | significantly greener and cleaner; markedly to distinctly glossier | 19 |
| 41 | 36 | significantly glossier; markedly to distinctly more transparent; markedly cleaner | 20 |
| 42 | 37 | distinctly more transparent and greener; somewhat cleaner and matter | 22 |
| 43 | 38 | distinctly more transparent; markedly glossier | 23 |
| 44 | 39 | markedly to distinctly more transparent and glossier; markedly redder | 24 |

-continued

| Coloration example | Pigment of example | Coloristic assessment | Pigment of comparative example |
|---|---|---|---|
| 45 | 39 | significantly more transparent; distinctly glossier; markedly greener | 25 |
| 46 | 40 | significantly greener, more transparent and glossier | 27 |
| 47 | 41 | distinctly more transparent and glossier; somewhat greener and cleaner | 28 |
| 48 | 41 | significantly more transparent and glossier; markedly redder | 29 |
| 49 | 41 | markedly to distinctly greener, cleaner, more transparent and glossier | 30 |
| 50 | 42 | significantly more transparent; distinctly greener; somewhat cleaner and matter | 31 |
| 51 | 43 | distinctly more transparent, glossier, cleaner and greener | 32 |
| 52 | 44 | markedly to distinctly more transparent and glossier | 33 |
| 53 | 44 | significantly more transparent and glossier; somewhat redder and duller | 34 |
| 54 | 45 | distinctly more transparent and glossier | 35 |
| 55 | 46 | distinctly more transparent and glossier, somewhat greener | 36 |
| 56 | 47 | markedly greener and cleaner; significantly more transparent and glossier | 37 |

Further application comparisons:

The pigment of Example 2 has a distinctly better solvent fastness (according to DIN 16524) than the pigment of Example 17.

The pigment of Example 19 has a markedly better solvent fastness (according to DIN 16524) than the pigment of Example 20.

The pigment of Example 19 has a markedly better solvent fastness (according to DIN 16524) than the pigment of Example 21.

The pigment of Example 19 has a distinctly better solvent fastness (according to DIN 16524) than the pigment of Example 22.

The pigment of Example 41 has a significantly better solvent fastness (according to DIN 16524) than the pigment of Comparative Example 33.

The 12% strength printing ink concentrate prepared from the pigment of Example 19 has a significantly lower viscosity than that prepared from a pigment according to Example 20.

The pigment of Example 33 can be made into a printing ink in the Paint Shaker, whereas the pigment of Comparative Example 15 thickens and cannot be processed.

The pigment of Example 37 can be made into a printing ink in the Paint Shaker, whereas the pigment of Comparative Example 21 thickens and cannot be processed.

The pigment of Example 40 can be made into a printing ink in the Paint Shaker, Whereas the pigment of Comparative Example 26 thickens and cannot be processed.

What is claimed is:

1. A process for preparing printing inks comprising the step of preparing a disazo pigment of the formula (I) or a mixture of said disazo pigments

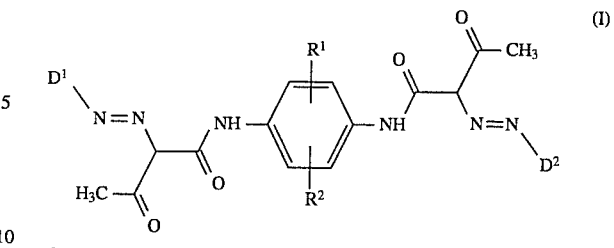

where

D$^1$ and D$^2$ are identical or different and each is unsubstituted phenyl or phenyl substituted by from 1 to 3 radicals selected from the group consisting of C$_1$–C$_4$-alkyl, C$_1$–C$_4$-alkoxy, phenoxy, halophenoxy, carboxyl, carbalkoxy, acyl, acyloxy, acylamino, N-mono- or N,N-disubstituted carbamoyl, N-mono- or N,N-disubstituted sulfamoyl, sulfo, cyano, halogen, nitro and trifluoromethyl; or each is an anthraquinone radical which is linked by the 1- or 2-position to the nitrogen atom of the azo bridge and is unsubstituted or substituted by from 1 to 3 radicals selected from the group consisting of halogen, hydroxyl, nitro, C$_1$–C$_4$-alkyl, carboxyl, acyl, COO-C$_1$–C$_4$-alkyl, CONH$_2$, acylamino, C$_1$–C$_4$-alkoxy, C$_1$–C$_8$-alkylamino, benzylamino, anilino, C$_1$–C$_4$-alkylthio and C$_1$–C$_4$-alkylphenylsulfonylamino; or each is a radical of an aromatic heterocycle selected from the group consisting of benzimidazole, benzimidazolone, benzimidazolethione, benzoxazole, benzoxazolone, benzothiazole, 2-phenylbenzothiazole, benzothiazolone, indazole, phthalimide, naphthalimide, benzotriazole, quinonline, quinazoline, quinazolinone, phthalazine, phthalazinone, quinoxaline, benzo{c,d,}indolone, benzimidazo{1,2}-pyrimidone, benzo{e}{1,3}oxazinone, dibenzo{a,c}phenazine, quinoxalinone, carbazole and indole, said heterocycles being unsubstituted or substituted by from 1 to 3 radicals selected from the group consisting of halogen, amino, (C$_1$–C$_4$-alkyl, acetamido, carbomethoxyamino, C$_1$–C$_4$-alkoxy, nitro, hydroxyphenyl, phenyl, sulfo and carboxyl, R$^1$ and R$^2$ are identical or different and each is hydrogen, halogen, C$_1$–C$_4$-alkyl, C$_1$–C$_4$ -alkoxy, C$_1$–C$_5$-alkoxycarbonyl, nitro, cyano, phenoxy or trifluoromethyl, by azo coupling, which comprises am coupling in an aqueous medium and in the absence of an organic solvent and without a separate after treatment in an organic solvent and adding at the latest immediately prior to the isolation of the disazo pigment at least one nonionic surfactant which has a cloud point in aqueous solution;

and incorporating said disazo pigment into a printing ink medium.

2. The process as claimed in claim 1, wherein the printing ink is a solvent-containing intaglio or flexographic printing ink.

3. The process as claimed in claim 1, wherein the printing ink is a water-borne intaglio or flexographic printing ink.

4. The process as claimed in claim 1, wherein the addition of the nonionic surfactant(s) takes place prior to azo coupling.

5. The process as claimed in claim 1, wherein the addition of the nonionic surfactant(s) takes place after azo coupling prior to a heating-up of the reaction mixture.

6. The process as claimed in claim 1, wherein the cloud point of the nonionic surfactant(s) in water is between 5° and 90° C.

7. The process as claimed in claim 1, wherein the cloud point of the nonionic surfactant(s) in water is between 20° and 70° C.

8. The process as claimed in claim 1, wherein the nonionic surfactant(s) is or are adding in an mount of from 3 to 25 parts by weight, based on 100 parts by weight of disazo pigment or disazo pigment mixture.

9. The process as claimed in claim 1, wherein the nonionic surfactant(s) is or are added in an amount of from 7 to 17 parts by weight, based on 100 parts by weight of disazo pigment or disazo pigment mixture.

10. The process as claimed in claim 1, wherein the nonionic surfactant used is an alkoxylate of an aromatic, cycloaliphatic or heterocyclic hydroxy or amino compound or a mixture of at least two such alkoxylates.

11. The process as claimed in claim 1, wherein the nonionic surfactant used is at least one compound selected from the group of alkoxylates of alcohols, fatty alcohols, phenols, alkylphenols, naphthols, alkylnapthols or fatty mines.

12. The process as claimed in claim 1, wherein the nonionic surfactant used is an ethylene oxide adduct or propylene oxide adduct with a fatty alcohol, phenol, alkylphenol, naphthol, alkylnaphthol or fatty amine.

13. The process as claimed in claim 1, wherein the nonionic surfactant used is a block polymer of ethylene oxide, propylene oxide or a mixture thereof.

14. The process as claimed in claim 1, wherein the nonionic surfactant is a mixture formed in the alkoxylation of synthetic fatty alcohols from the oxo process or in the alkoxylation of natural fatty alcohols.

15. The process as claimed in claim 14, wherein the natural fatty alcohols are obtainable by fat cleavage and reduction of coconut oil, palm oil, cottonseed oil, sunflower oil, soybean oil, linseed oil, rapeseed oil, tallow or fish oil.

16. The process as claimed in claim 1, wherein the nonionic surfactant is an ethoxylate, oxypropylate or a combination thereof of cocoamine, tallowamine or oleylamine.

17. The process as claimed in claim 1, wherein $D^1$ and $D^2$ have the same meaning.

18. The process as claimed in claim 1, wherein an amino of the formula D-H$_2$ is diazotized and coupled with from 0.5 to 0.53 mol, based on one mole of the amine D-NH$_2$, of a compound of the formula

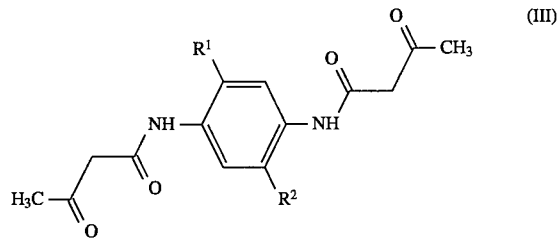

where
$R^1$ and $R^2$ are identical or different and each is hydrogen, chlorine, bromine, trifluoromethyl, methyl, ethyl, methoxy, ethoxy, propoxy, butoxy, cyano, nitro, ethoxycarbonyl or methoxycarbonyl.

* * * * *